United States Patent
Begg et al.

(10) Patent No.: US 7,076,489 B2
(45) Date of Patent: Jul. 11, 2006

(54) SYSTEM AND METHOD FOR ENABLING EFFICIENT MULTI-PROTOCOL DATABASE TRANSACTION PROCESSING

(75) Inventors: Robert A. Begg, Scarborough (CA); Jo-Anne M. Kirton, Richmond Hill (CA); Timothy J. Vincent, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/390,062

(22) Filed: Mar. 14, 2003

(65) Prior Publication Data

US 2004/0078377 A1    Apr. 22, 2004

(30) Foreign Application Priority Data

Oct. 17, 2002  (CA) .................................. 2408474

(51) Int. Cl.
  *G06F 17/30* (2006.01)
(52) U.S. Cl. .................... 707/10; 707/100; 709/217
(58) Field of Classification Search ............... 707/10, 707/100; 709/217–219
See application file for complete search history.

(56) References Cited

U.S. PATENT DOCUMENTS 5,437,027 A * 7/1995 Bannon et al. ......... 707/103 R
5,692,193 A * 11/1997 Jagannathan et al. ....... 719/315
6,199,068 B1 * 3/2001 Carpenter .................... 707/100
2005/0166209 A1 * 7/2005 Merrick et al. ............. 719/310

OTHER PUBLICATIONS

J. Suzuki and Y. Yamamoto, "Toward the Interoperable Software Design Models: Quartet of UML, XML, DOM and CORBA," In Proceedings of the 4th IEEE International Software Engineering Standards Symposium (ISESS'99), Curitiba, Brazil, May 1999.

* cited by examiner

*Primary Examiner*—Jean M. Corrielus
*Assistant Examiner*—Anh Ly
(74) *Attorney, Agent, or Firm*—Samuel A. Kassatly

(57) ABSTRACT

A system provides efficient multi-protocol database transaction processing in a multi-communications protocol and multi-programming model computing environment. The system separates the source and the target functionalities, and uses generic function names linked to function pointers, in order to permit the source layer to call embedded functions in the target layer. As an example, the system provides a source layer code path that includes embedded call-back functions and embedded generic function names. A target layer code path is set to include embedded functions and generic call-back function names. A function pointer array permits the source layer code path to call functions embedded in the target layer code path using the generic function names. A call-back function pointer array permits the target layer code path to call the call-back functions embedded in the source layer code path using the generic call-back function names.

19 Claims, 6 Drawing Sheets

SYSTEM AND METHOD FOR ENABLING EFFICIENT MULTI-PROTOCOL DATABASE TRANSACTION PROCESSING

PRIORITY CLAIM

The present application claims the priority of Canadian patent application, Serial No. 2,408,474, titled "Apparatus And Method For Enabling Efficient Multi-Protocol Database Transaction Processing," which was filed on Oct. 17, 2002, and which is incorporated herein by reference.

FIELD OF THE INVENTION

The present invention relates to database transaction processing, and in particular, to an system and associated method for enabling database transaction processing of different data, which conform to different protocols and application programming interfaces, to be efficiently processed by a transaction processor.

BACKGROUND OF THE INVENTION

Databases are repositories of information that are used in every sector of the economy to provide access to information. There are numerous kinds of databases, many different organizations of the data they contain, many different ways in which that the data can be indexed and retrieved, and many different data models for storing and retrieving the information.

Part of the reason for the wide and growing use of databases is that databases can be accessed in many ways to support many different operations. Application programming interfaces (APIs) have been designed to enable substantially any program to access a database during execution. As well, worldwide web browsers can access databases using active server pages, etc. The combined effect of the numerous and growing different mechanisms for accessing databases is a substantial increase in demand for databases. However, a plurality of interface types are required because of the many and growing number of diverse access mechanisms and corresponding programming models, protocols, data formats, etc.

Structured query language (SQL) is an example of an open standard for permitting access to different databases. While SQL provides a framework for database transactions, a number of implementations, protocol drivers, and communications protocols may be used to instantiate SQL requests. Furthermore other competing programming models, languages, protocols, and implementations may have respective merits for providing simplicity, efficiency, or other desirable qualities in respective computing environments. Importantly, new access techniques are being developed. Consequently, database access systems generally have to be rewritten to permit new functionality for these new access techniques. Rewriting database access systems is very expensive and time consuming.

While methods for incorporating multiple protocol and programming model layers in a database system are known, these are generally inefficient. One solution is to provide a respective code path for each pair of receive and transmit layers so that a particular type of interface is effected using the respective code paths. While this solution may facilitate addition of an interface type, this multifaceted approach contributes significantly to the complexity of the programs used to enable these interfaces.

Furthermore, whenever one aspect of one of the receive or transmit layers has to be upgraded, all of the code paths have to be independently upgraded, and addition of one type of receive or transmit layer, hereinafter respectively referred to as the source and target layers, requires the addition of code paths for each of the source and target layer pairs. In accordance with another solution, a neutral internal language is used, and all source layers are translated into the neutral language, which is then translated into respective target layer formats.

While this is an improvement over the multiple code paths, large amounts of memory are consumed because all of the data has to be stored multiple times to format and reformat the data. The memory provision becomes expensive in high volume database servers and other computers that perform database transaction processing.

Therefore, there exists a need for an apparatus and method for enabling more efficient handling of database transaction processing that permits independence between source and target layers but does not require duplication of transaction data during processing. The need for such a system has heretofore remained unsatisfied.

SUMMARY OF THE INVENTION

The present invention satisfies this need, and presents a system, a computer program product, and associated method (collectively referred to herein as "the system" or "the present system") for enabling efficient handling of database transaction processing while separating source and target layers in a multi-communications protocol and multi-programming model computing environment.

It is a feature of the present system to provide client and server computers for enabling efficient handling of database transaction processing in a multi-communications protocol and multi-programming model computing environment.

The present system therefore provides a method for providing a computing machine for processing database transactions in a multi-communications protocol and multi-programming model computing environment. The method comprises the step of providing a source layer code path that includes embedded call-back functions and embedded generic function names.

A target layer code path that includes embedded functions and embedded generic call-back function names is also provided. A function pointer array is provided to permit the source layer code path to call functions embedded in the target layer code path using the generic function names. A call-back function pointer array is also provided to permit the target layer code path to call the call-back functions embedded in the source layer code path using the generic call-back function names.

The method further comprises the step of linking respective call-back function pointers to corresponding call-back functions embedded in the source layer code path, and respective function pointers to corresponding functions embedded in the target layer code path. At run time, the generic function names are linked to function pointers in the function pointer array and the call-back function names are linked to call-back function pointers in the call-back function pointer array.

On client computing machines, a client source layer code path is provided for each programming model, and a client target layer code path is provided for each communications protocol used in the multi-communications protocol and multi-programming computing environment.

On server computing machines, a server source layer code path is provided for each communications protocol, and a server target layer code path is provided for each programming model used in the multi-communications protocol and multi-programming model computing environment.

The present system further provides a computer-readable memory for enabling the processing of database transactions in a multi-communications protocol and multi-programming model computing environment. The computer-readable memory comprises a source layer code path including embedded call-back functions and embedded generic function names for calling embedded functions in a target layer code path. The target layer code path includes the embedded functions and embedded generic call-back function names for calling the embedded call-back functions in the source layer. A function pointer array is linked to the embedded functions in the target layer code path to permit the source layer code path to call the functions embedded in the target layer code path using the generic function names. A call-back function pointer array is linked to the embedded call-back functions in the source layer to permit the target layer code path to call the call-back functions embedded in the source layer code path using the generic call-back function names embedded in the target layer.

The present system further provides a client computer adapted to permit a user to request information from a database in a multi-communications protocol and multi-programming model computing environment. The client computer comprises a source layer code path adapted to receive a database request from the user. This source layer code path includes embedded call-back functions and embedded generic function names for calling embedded functions in a target layer code path adapted to format and send the database request to a database server computer in the computing environment.

The target layer code path includes the embedded functions and embedded generic call-back function names for calling the embedded call-back functions in the source layer code path to permit data in the database request to be moved to a communications buffer. The target layer code path uses this communication buffer to send the database request to the database server computer.

A function pointer array is linked to the embedded functions in the target layer code path to permit the source layer code path to call the functions embedded in the target layer code path using the generic function names embedded in the source layer code path. A call-back function pointer array is linked to the embedded call-back functions in the source layer to permit the target layer code path to call the call-back functions embedded in the source layer code path using the generic call-back function names embedded in the target layer.

The present system also provides a server computer adapted to respond to the client request for information from the database. A source layer code path is adapted to receive database requests from the client computer. This source layer code path includes embedded call-back functions and embedded generic function names for calling embedded functions in a target layer code path adapted to retrieve information requested by the database request from the database.

The target layer code path includes the embedded functions and embedded generic call-back function names for calling the embedded call-back functions in the source layer to permit data in a database response to be moved to a communications buffer. The source layer code path uses this communications buffer to return the database response to the client computer.

A function pointer array is linked to the embedded functions in the target layer code path to permit the source layer code path to call the functions embedded in the target layer code path using the generic function names. A call-back function pointer array is linked to the embedded call-back functions in the source layer code path to permit the target layer code path to call the call-back functions embedded in the source layer code path using the generic call-back function names.

The server computer may comprise a gateway server or a database server. If the server computer is a database server, the target layer code path comprises a database engine.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

API: Application Program Interface, a language and message format used by an application program to communicate with the operating system or some other control program such as a database management system (DBMS) or communications protocol.

Instantiate: In object-oriented technology, to create an object of a specific class.

SQL: Structured Query Language, a standardized query language for requesting information from a database.

The present system provides a method for processing database transaction data in a multi-protocol, multi-programming model environment in a manner that facilitates addition of new access protocols and programming data models. The present system further provides a mechanism for efficiently moving and converting database transaction data between source and target layers of client computers, database servers, and gateway servers.

The present system includes a software programming code or computer program product that is typically embedded within, or installed on a computer. Alternatively, this software programming code can be saved on a suitable storage medium such as a diskette, a CD, a hard drive, or like devices.

Figure 1A:
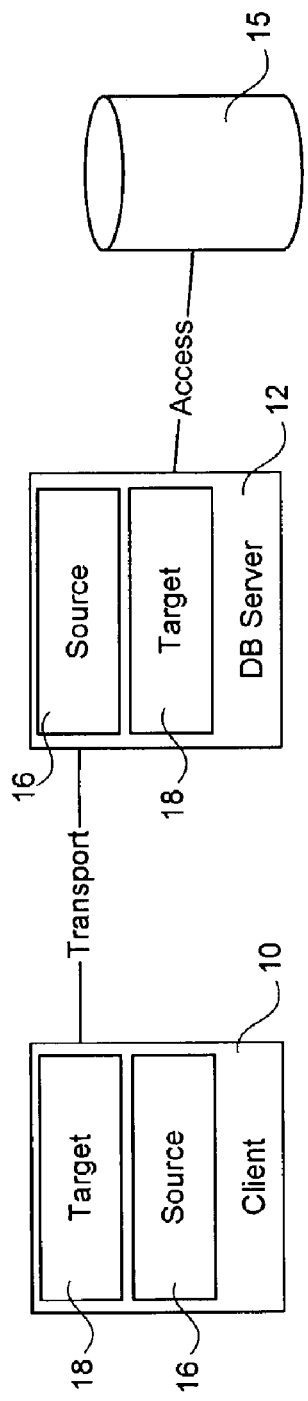
FIG. 1 comprises FIGS. 1A and 1B, and represents a schematic illustration of an exemplary operating environment in which a system for processing database transaction data can be used.
Figure 1B:
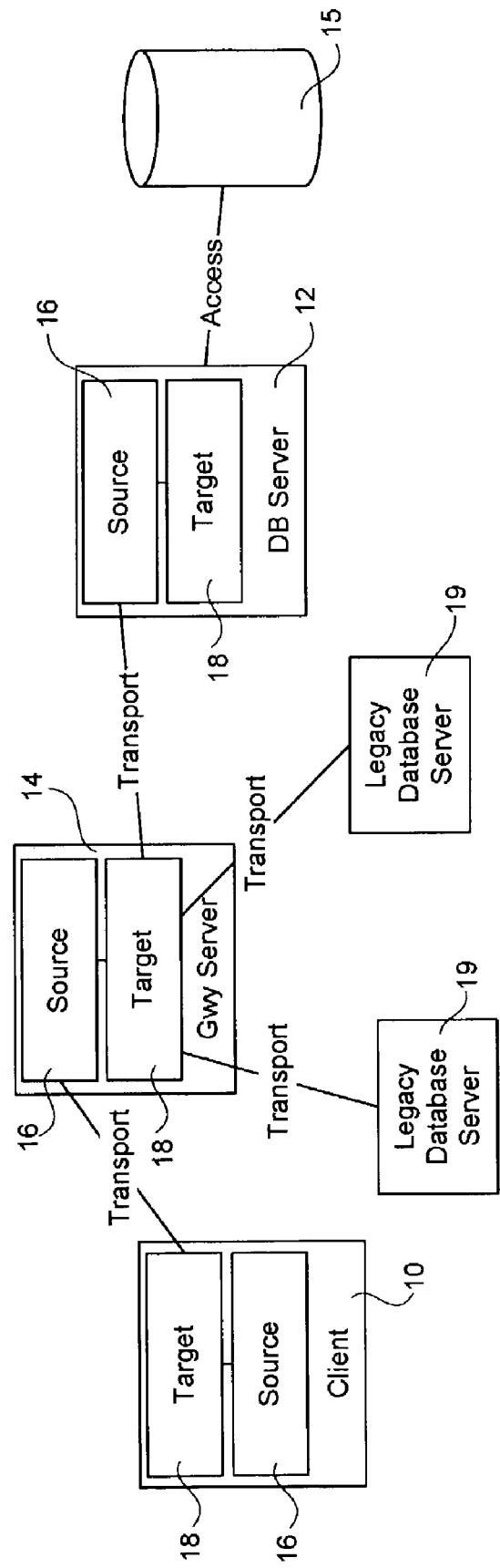

FIG. 1 (FIGS. 1A, 1B) schematically illustrates two database access environments provisioned in accordance with the present system. As is well known in the art, a networked client computer 10 can be used to access a database (DB) server, such as DB server 12, either directly, as shown in FIG. 1A, or via a gateway server 14, as shown in FIG. 1B. The manner in which the DB server 12 provides the client with access to content of a database 15 and the manner in which the gateway server 14 controls access to a plurality of legacy database servers 19 and the DB server 12 are well known in the art.

The present system provides a source layer 16 and a target layer 18 used to enable independence of protocol and programming model-specific functionality, such that modification, addition and deletion of protocols and programming models is enabled. The source layer 16 and target layer 18 retain a common set of code paths for invoking protocol and programming model-specific functionality. The term "source" is applied to a layer to indicate that it is nearer in the chain of communication processors to the requester; "target" indicates a layer that it is nearer to the database 15.

Source and target layers 16, 18 in accordance with the present system are instantiated on each of the client computer 10, gateway server 14, and DB server 12.

Figure 2:
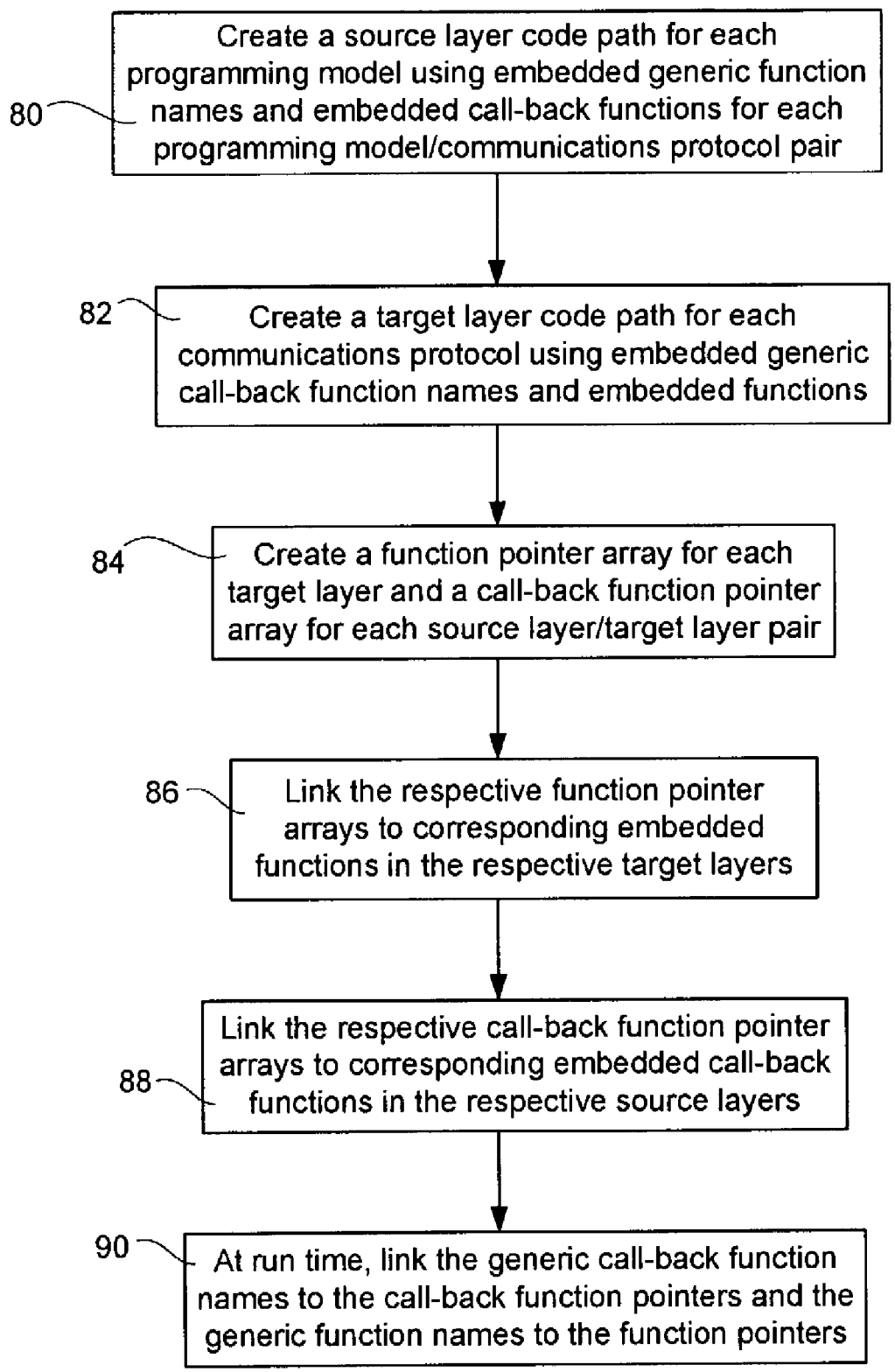
FIG. 2 is a flow chart illustrating principal steps in implementing the a method for processing database transaction data system of FIG. 1.

FIG. 2 illustrates principal steps involved in provisioning a computer for database transaction processing in accordance with the present system. Programming models that the computer/server are to support and communications protocols that are to be used to exchange data between them are predetermined. In step 80, source layers are created by providing a code path for each of the programming models.

The programming models include those associated with respective Structured Query Language (SQL) protocol drivers/application programming interfaces (APIs), e.g. call level interface (CLI), open database connectivity (ODBC), embedded SQL, java database connectivity (JDBC), activeX data object (ADO), etc. The communications protocols include protocols used for receiving transaction data from other computers, e.g. distributed relational database architecture access server (DRDA/AS), database 2 request access/access server (DB2RA/AS), etc.

Figure 3A:
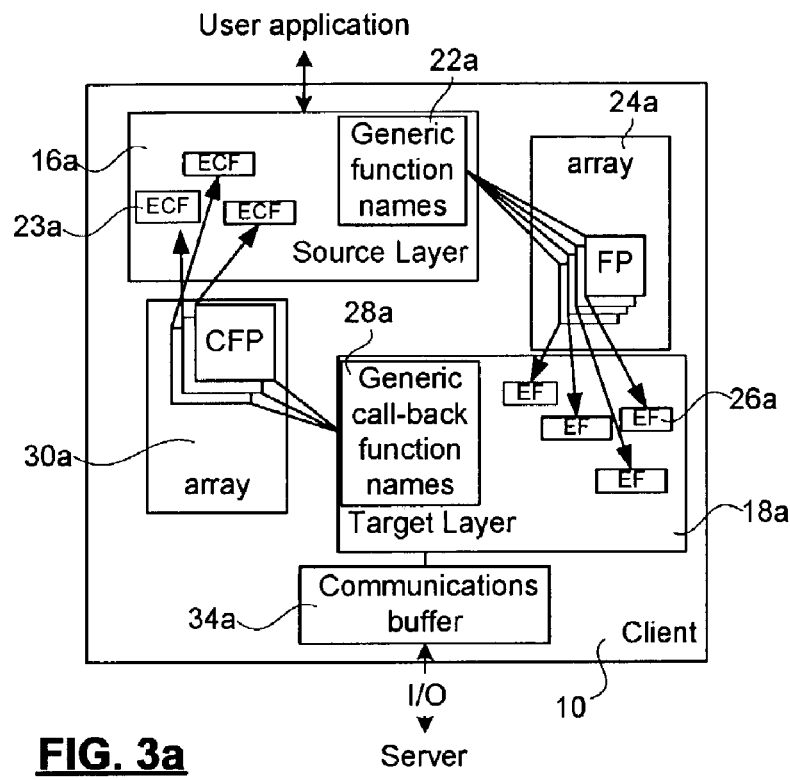
FIG. 3 comprises FIGS. 3A and 3B, and represents principal database access elements of systems provisioned with software in accordance with the method for processing database transaction data system of FIG. 1.
Figure 3B:
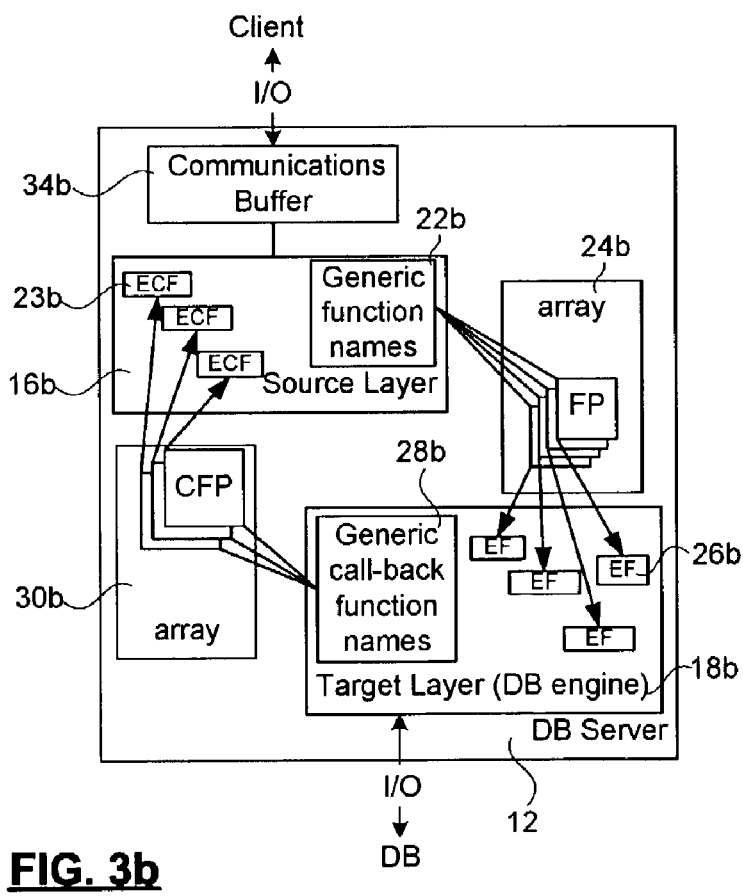

Each of the programming model-specific source layer code paths includes all of the functionality required to receive transaction data from a protocol driver, interpret the transaction data in accordance with the selected programming model, and select, initialize, and call target layer code paths. Accordingly, each source layer code path includes embedded generic function names that are used to call embedded target layer functions. Likewise, call-back functions specific to each supported programming model/communications protocol pair are embedded in each source layer code path. In addition, each target layer code path includes embedded call-back functions names that are used to call the call-back functions embedded in the corresponding source layer code path, as will be explained below in more detail with reference to FIG. 3 (FIGS. 3A, 3B).

In step 82, the target layers are instantiated by creating a code path for each of the communications protocols. Each target layer includes embedded generic call-back function names for invoking the embedded call-back functions in a corresponding source layer code path and embedded functions invoked by respective generic function names embedded in the respective source layer code paths.

Once the source and target layers are created, a function pointer array is created for each of the target layers and a call-back function pointer array is created for each programming model and communications protocol pair (step 84). The respective embedded functions in the target layer are linked to respective corresponding entries in the function pointer array (step 86) and respective embedded call-back functions in the source layer are linked to respective corresponding entries in the call-back function pointer array (step 88).

At run time, when a connection to a database is instantiated, the generic call-back function names embedded in a target layer code path required for the connection are linked to the call-back function pointers. Likewise, the generic function names embedded in the source layer required for the source program model are linked to the function pointers (step 90).

FIG. 3A schematically illustrates principal database access elements of a client 10 that performs database transaction processing in accordance with the present system. The client 10 includes the source layer 16a and the target layer 18a that provide programming model and communications protocol-specific functionality. For the purposes of describing the present system, functional blocks representing a user interface application that instantiates the source layer 16a and supplies data to the source layer 16a are not illustrated.

The results of a database request are also returned to the user interface application by the source layer 16a. The source layer 16a may be embodied in the user-interface application or in a separate application or set of APIs that the user-interface application invokes. Generally, an application source layer on a client computer provides a user interface that permits a user to request information from a database. The user selects or otherwise indicates desired data. Application programming interfaces (APIs) load the function pointers and instantiate the source layer 16a.

Accordingly, the source layer 16 comprises a plurality of generic function names 22a and embedded callback functions (ECFs) 23a that the target layer accesses using generic call-back function names. The generic function names 22a are linked to respective entries in a function pointer array 24a that was loaded prior to the invoking of the source layer 16a. The function pointer array 24a points to embedded functions (EFs) 26a of the target layer 18a. Symmetrically, the target layer 18a comprises the embedded functions 26a in addition to generic call-back function names 28a that are used to invoke the embedded call-back functions 23a using a call-back function pointer array 30a.

As previously described, different programming models and communications protocols may be concurrently supported by a computer for processing database transaction data in accordance with the present system. An advantage of the present system is that different source layer code paths can be treated independently, so that, for example, adding a new communications protocol requires creating code path(s) for the new layer(s) with the embedded functions/call-back functions and associated functions/call-back function pointer arrays.

As will be understood by those skilled in the art, a transport layer of the client 10 (not illustrated) provides communication between the client 10 and the connected server. For example, a socket instantiated by a set of APIs of an application/protocol driver is supported by a transport layer functionality provided by an operating system of the computer/server, in a manner well known in the art. Network connection management is performed at the transport layers, and is transparent to the target and higher layers. When a connection is successfully made, a target software layer is associated with the socket (or similar network connection). The target layer 18a is a protocol driver that exchanges data with the server through the connection.

FIG. 3B illustrates principal components of a DB server 12 configured in accordance with the present system. The communications buffer 34b receives database transaction data from a socket (or the like) in conformance with a protocol associated with the source layer 16b. As compared to FIG. 3B, similarly named functional elements operate in substantially the same manner except that rather than relaying the transaction data to a next server (which would be done if the server shown in FIG. 3B were a gateway server, rather than a DB server), the transaction data is forwarded to the database.

These similarly named functional elements include the embedded call-back functions 23b, the generic function names 22b, the function pointer array 24b, the target layer 18b, embedded functions 26b, generic call-back function names 28b and call-back function pointer array 30b. The target layer 18b therefore functions as a database engine. The database engine interacts with the database (DB) to retrieve data and perform data maintenance tasks.

The source layer 16a,b and target layer 18a,b code paths respectively inter-operate by invoking functions in their respective counterparts using the embedded generic function names. As is well understood, different programming models and communications protocol may require very different functions and procedures. For example, structured query language (SQL) commands are used in some embodiments to provide functions associated with formatting data in an expressive, standards-based language that permits access to different types of databases. Further commands for transaction management and connection management may be required to perform protocol and programming model-specific functions.

TABLE 1

Generic SQL Function Names
SQL Function execute
fetch
open
close
describe
prepare
execute immediate
excsqlset
prepare init
prepare fini
compile
add host vars
rebind
array input
begin atomic chain
end chain
interrupt
call
ping Table 1 illustrates an example of a set of SQL functions used for creating generic function names in code paths in accordance with the present system. Those skilled in the art will recognize that all of these functions are not defined SQL functions. Specifically "begin atomic chain" and "end chain" are not in the standard complement of SQL functions. Further extensions to the standard functions may be required or useful depending on changes and developments in database access techniques. The generic function name "call" is used to invoke utility functions, such as those that permit creation of a database, those for determining a number of procedures in a server's queue, etc.

As will be understood by those skilled in the art, different user interactive applications (and different modes of some user interactive applications) may issue database requests in formats corresponding to different programming models. At a source layer 16a of a client computer, interpretation of a database request is performed by invoking application specific procedures; these application specific procedures are invoked by invoking these generic function names.

TABLE 2

Generic Transaction Management Functions Names
Transaction Management commit
rollback
XA recover
XA forget
XA prepare
XA commit
XA rollback
XA end
XA register
XA preprocess
XA post process
XA log
TM prepare
TM request resync
TM add resync Transaction management is well understood in the art and is used for ensuring that transactions are completed and logged or rolled back in the event of a failure. Consequently, the data in the database is not changed unless a complete transaction has succeeded, using known techniques for maintaining data integrity. Further it is known that multiple systems for managing transactions can be used concurrently. For example, extended architecture (XA) provides management functions for database transactions that provide excellent control over data, and can be used intermittently with other transaction management functions.

TABLE 3

Generic Connection Management Function Name
Connection Management connect
attach
terminate connection
terminate attachment
switch application Managing connections is well understood by those skilled in the art and may require different procedures, depending on the received data used to generate the database transaction. A target layer is created for duration of a network connection. When a source is invoked that is of a different type than a previous source that used the target, the switch application command shown in Table 3 is used to effect the loading of call-back function pointers so that the target correctly handles data it receives from the new source.

The generic call-back function names are used by the target 18a,b to call call-back functions embedded in the source layer 16a,b. The call-back functions convert and move transaction data. The data is converted from communication protocols and programming models of source layer 16a,b and target layer 18a,b of the computer/server that processes database transactions.

The computer/server also moves the data between the source layer 16a,b and target layer 18a,b. The source layer 16a,b on the client side is the user interface application, if the computer is a client 10, and a network connection communications buffer 34b otherwise. The target layer 18a,b is the database engine, if the computer/server is a DB server, and a communications buffer 34a on the client side.

The data received from the source layer is converted into a format that corresponds to the target layer communication protocol and programming model. Equally, response data received from the communications buffer is returned to the source layer with conversion, using call-back function pointers.

Programming models and communications protocols of transaction data, in accordance with the present system, are governed by such established standards as communication protocols, data types, character codes, and data structure formats that are used for the interpretation and formatting (conversion) of the transaction data. Often communications protocols govern packaging of data, and therefore are used for extraction of transaction data from one or more data sections of protocol data units (PDUs) that are used for transporting the transaction data. Various ways of identifying content of a PDU are known in the art.

An order in which bits/bytes of data are inserted into a data section of a PDU is usually governed by the communications protocol, but many other aspects of how data is represented are independent of communications protocols and are more tightly tied to applications that generate the data. These aspects are associated with data types used, character sets, integer representations, etc. Conversion of transaction data using embedded call-back functions corrects for differences in these aspects of the format of the transaction data by manipulating the data during the read/write procedures. Advantageously data does not need to be copied during this conversion.

A respective set of transforming procedures that are well known in the art for reformatting data are called by the generic call-back function names 28a,b. The call-back function pointer arrays 30a,b loaded into memory depend on both the source layer 16 and the target layer 18. The function pointer arrays 24a,b loaded into memory depend only on the associated target layer 18.

Figure 4:
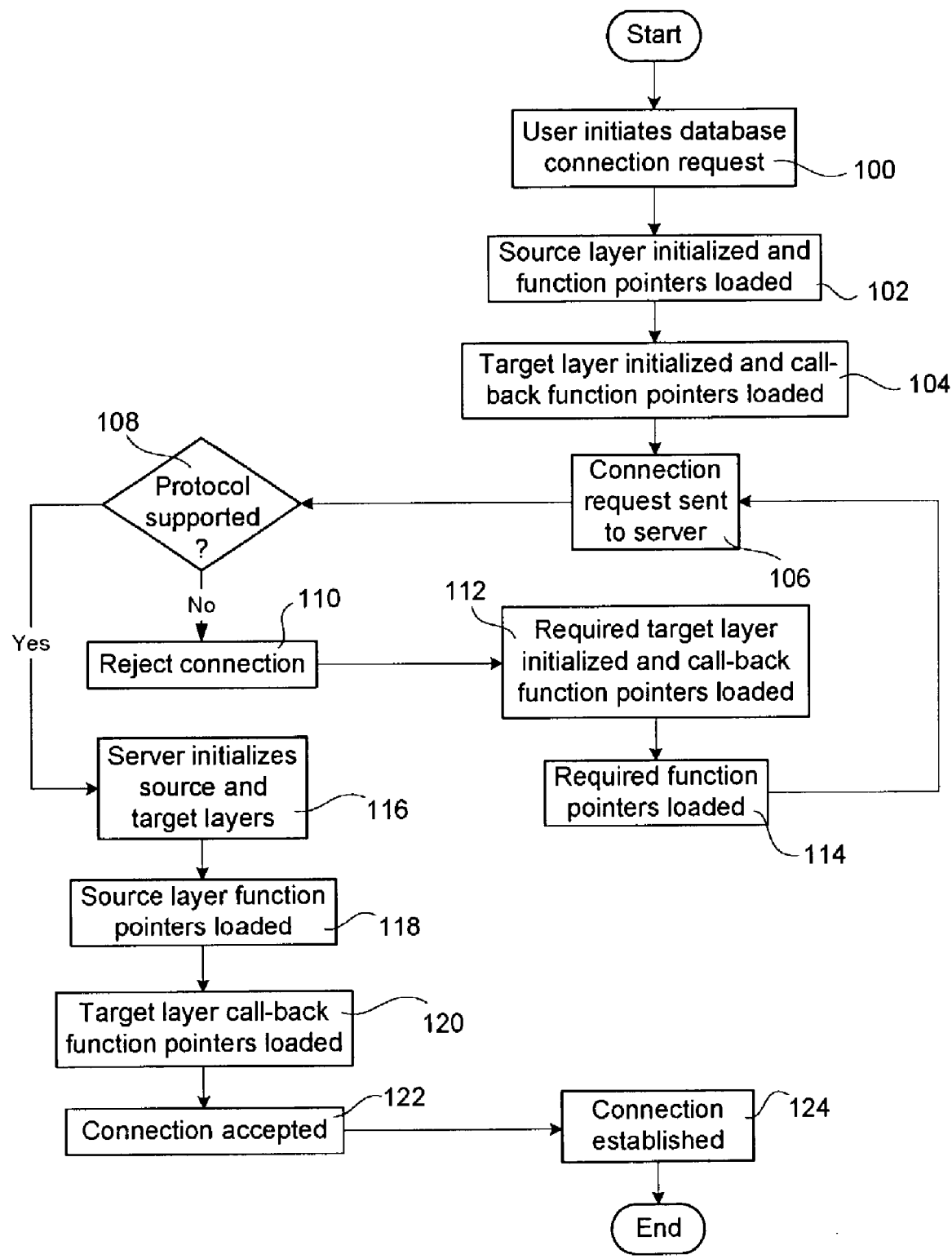
FIG. 4 is a flow chart illustrating principal steps in establishing a database connection in accordance with the method for processing database transaction data system of FIG. 1.

FIG. 4 illustrates principal steps involved in establishing a connection between a client 10 and DB server 12 in accordance with an embodiment of the present system. In step 100, a user of an application initiates a database connection request. In response to this request, a source layer 16a is initialized (step 102) and the function pointer array 24a is loaded into memory. The source layer code path selected is dependent on a program model used to create the requesting application. A target layer 18a is also initialized (step 104), and the corresponding call-back function pointer array 30a is loaded into memory. A connection request is then sent (step 106) to a server. The server may be either a gateway server or a DB server 12; this example uses a DB server. If the communications protocol of the target layer 18a is supported by the DB server 12, as determined in step 108, the connection is accepted by the DB server 12.

However, if the connection is rejected (step 110), another target layer 18a that supports the required communications protocol is initialized and the associated call-back function pointer array 30a is loaded into memory (step 112). The function pointer array 24a associated with the source layer 16a/target layer 18a pair is also loaded into memory, in step 114.

If the connection is accepted at the DB server 12 (step 108), the DB server 12 initializes the source layer 16b and target layer 18b (assuming that no suitable target layer 16b is already available for the connection) in step 116. The function pointer array 24b is loaded for the source layer (step 118), and the call-back function pointer array 30b is loaded for the target layer 18b, if required (step 120). The DB server 12 then acknowledges the connection request issued by the client computer 10 (step 122). The connection is therefore established in step 124.

Figure 5A:
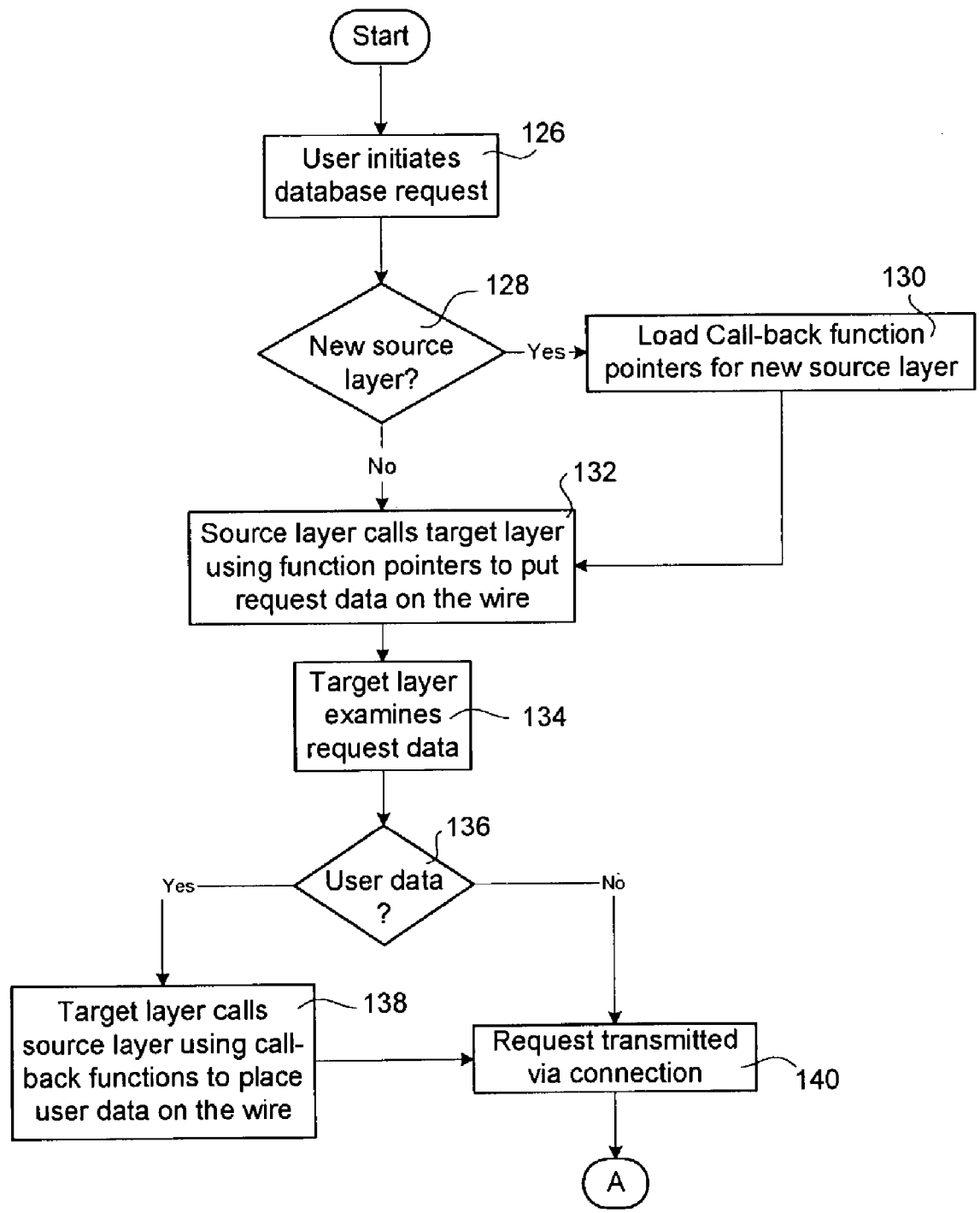
FIG. 5 comprises FIGS. 5A and 5B, and illustrates the principal steps involved in a database transaction between a database server and client computer provisioned in accordance with the method for processing database transaction data system of FIG. 1.
Figure 5B:
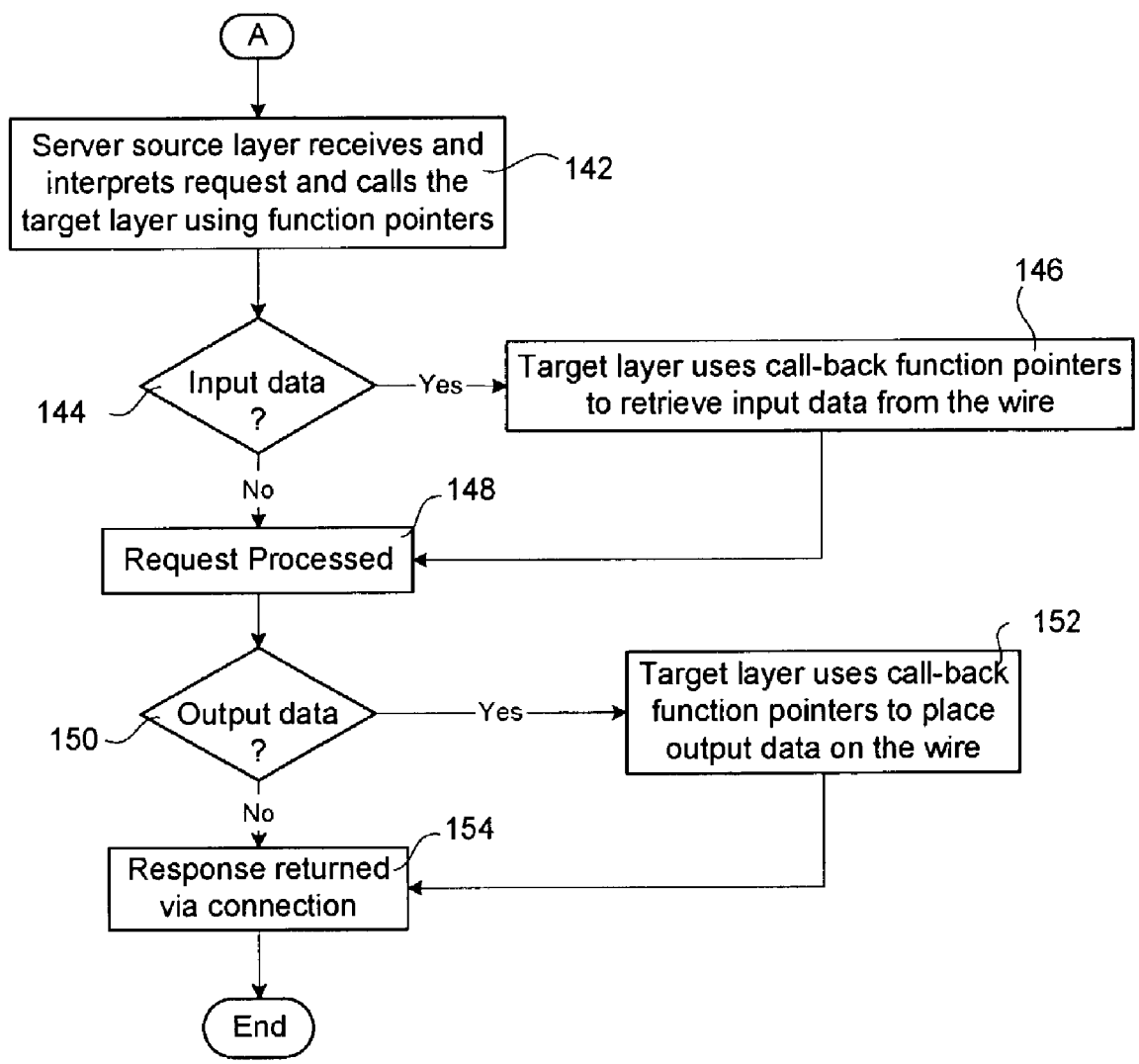

FIG. 5 (FIGS. 5A,B) illustrates the principal steps involved in retrieving data from a DB server, in accordance with an embodiment of the present system. In step 126, a user initiates the database request. The client computer 10 examines the database request and determines whether the source of the request is new, in which case a new source layer 16a must be initialized (step 128).

If a new source layer 16a is initialized, the call-back function pointers 30a associated with the source layer 16a are loaded into memory (step 130). In either case, the source layer 16a calls the target layer 18a using the generic function names 22a and the function pointer array 24a in step 132. The target layer 18a then at step 134 examines the data as it moves initial parts of the transaction data into the communications buffer (i.e. "on the wire").

If in step 136 the target layer 18a determines that user data is needed to complete the transaction data, the target layer 18a calls the source layer 16a using the generic call-back function names 28a and call-back function pointer array 30a to retrieve the required data (step 138). In either event, the request is written to the communications buffer in a communications protocol that is associated with the target layer 18a and is transmitted in step 140.

In step 142 (of FIG. 5B), the source layer 16b of the DB server 12 receives the database transaction data, as formulated by the target layer 18a on the client computer 10. The source layer 16b interprets the transaction data and calls the target layer 18b using the generic function names 22b and the function pointer array 24b. The target layer 18b determines (in step 144) whether input data for the transaction is present in the communications buffer. If this input data is present, the target layer 18b invokes the required call-back functions 23b to retrieve the input data from the wire (step 146). In either case, the transaction data is processed by the database (DB) (step 148).

Subsequent to the processing of the request or query transaction data sent from the client to the database, a response is generated. If the target layer 18b determines that the response includes output data (in step 150), generic call-back function names 28b and the call-back function pointer array 30b convert the output data to a format associated with the source communications protocol for the reply (step 152). In either case, the response is returned via the connection between the DB server 12 and the client computer 10 at step 154.

The reply transaction data is returned via the connection to the client computer 10, and the target layer 18a of the client computer 10 retrieves the data, converts it and moves it to the source layer 16a using the generic call-back function names 28a and the call-back function pointer array 30a. The source layer 16a then interprets the response and provides data as required to the client application. The source layers 16a,b and target layers 18a,b remain unchanged for duration of the database transaction.

The present system therefore enables development of different connection types and protocols, etc., to provide new access capabilities or provide existing capabilities with greater facility. The method and apparatus permits greater independence between source and target layers and capitalizes on similarities of the functions performed by source and target layers on different platforms.

It will be appreciated that computer readable code may be uploaded (by a vendor) and downloaded (by an end user) via a network adapted for transporting or carrying a computer readable modulated carrier signal. The signal may embed computer readable codes that may be used for establishing the embodiments of the present system.

As an example, the signal may embed a computer readable code that may be used for directing a computing machine to process database transactions in a multi-communications protocol and multi-programming model computing environment. The computer readable code may also be used for establishing a computer-readable memory usable by a computing machine for enabling the processing of database transactions in a multi-communications protocol and multi-programming model computing environment.

The computer readable code may also be used for establishing a client computer adapted to permit a user to request information from a database in a multi-communications protocol and multi-programming model computing environment. In addition, the computer readable code may be used for establishing a server computer adapted to respond to a client request for information from a database in a multi-communications protocol and multi-programming model computing environment. Included in the meaning of the modulated carrier signal is a signal-bearing medium.

It is to be understood that the specific embodiments of the invention that have been described are merely illustrative of certain application of the principle of the present invention. Numerous modifications may be made to present invention described herein without departing from the spirit and scope of the present invention.

What is claimed is:

1. A processor-implemented method for processing database transactions comprising:
   providing an executable source layer code path comprising an embedded call-back function name and an embedded generic function name;
   providing an executable target layer code path comprising an embedded function name and an embedded generic call-back function name for calling the embedded call-back function name in the source layer;
   providing a function pointer array permitting the source layer code path to call a function name embedded in the target layer code path using the embedded generic function name;
   linking a function pointer in the function pointer array to a corresponding call-back function name embedded in the source layer code path;
   linking the function pointer to a corresponding function name embedded in the target layer code path;
   linking, at run time, the embedded generic function name to the function pointer in the function pointer array; and
   providing a call-back function pointer array permitting the target layer code path to call the call-back function name embedded in the source layer code path using the embedded generic call-back function name, permitting independence between the source layer and the target layer.

2. The method of claim 1, further comprising providing a client source layer code path for each programming model in a multi-communications protocol.

3. The method of claim 2, further comprising providing a client target layer code path for each communications protocol.

4. The method of claim 3, further comprising providing a server source layer code path for each communications model.

5. The method of claim 4, further comprising providing a server target layer code path for each programming model.

6. A client computer for processing database transactions, comprising:
   an executable source layer code path receiving a database query from a user, and comprising an embedded call-back function name and an embedded generic function name, for calling an embedded function name in a target layer code path to format and to send the database query to a database server computer;
   the target layer code path comprising the embedded function name and the embedded generic call-back function name for calling the embedded call-back function name in the source layer, to permit data in the database query to be moved to a communications buffer used by the target layer code path, to send the database query to the database server;
   a function pointer array linked to the embedded function name in the target layer code path, to permit the source layer code path to call the function name embedded in the target layer code path using the embedded generic function name;
   a function pointer in the function pointer array linked to a corresponding call-back function name embedded in the source layer code path;
   the function pointer linked to a corresponding function name embedded in the target layer code path;
   wherein the embedded generic function name, at run time, to the function pointer in the function pointer array; and
   a call-back function pointer array for permitting the target layer code path to call the call-back function name embedded in the source layer code path using the embedded generic call-back function name, permitting independence between the source layer and the target layer.

7. A server computer responding to a client request for information from a database, comprising:
   an executable source layer code path receiving a database request from a client, the source layer code path including an embedded call-back function name and an embedded generic function name for calling an embedded function name in a target layer code path retrieving information requested by the database request from the database;
   an executable target layer code path including the embedded function name and the embedded generic call-back function name, for calling the embedded call-back function name in the source layer, to permit data in a database response to be moved to a communications buffer used by the source layer code path, in order to return the database response to the client;
   a function pointer array linked to the embedded function name in the target layer code path to permit the source layer code path to call the function name embedded in the target layer code path using the generic function name embedded in the source layer code path;

a function pointer in the function pointer array linked to a corresponding call-back function name embedded in the source layer code path;

the function pointer linked to a corresponding function name embedded in the target layer code path;

wherein the embedded generic function name, at run time, to the function pointer in the function pointer array; and a call-back function pointer array for permitting the target layer code path to call the call-back function name embedded in the source layer code path using the embedded generic call-back function name, permitting independence between the source layer and the target layer.

8. The server computer of claim 7, wherein the server computer comprises a gateway server.

9. The sever computer of claim 7, wherein the server computer comprises a database server.

10. The server computer of claim 7, wherein the target layer code path comprises a database engine.

11. A computer program product having instruction codes stored on a computer-usable medium for processing database transactions, comprising:
- a set of instruction codes for providing an executable source layer code path comprising an embedded call-back function name and an embedded generic function name;
- a set of instruction codes for providing an executable target layer code path comprising an embedded function name and an embedded generic call-back function name for calling the embedded call-back function name in the source layer;
- a set of instruction codes for providing a function pointer array permitting the source layer code path to call a function embedded in the target layer code path using the embedded generic function name;
- a set of instruction codes for linking a function pointer in the function pointer array to a corresponding call-back function name embedded in the source layer code path;
- a set of instruction codes for linking the function pointer to a corresponding function name embedded in the target layer code path;
- a set of instruction codes for linking, at run time, the embedded generic function name to the function pointer in the function pointer array; and
- a set of instruction codes for providing a call-back function pointer array permitting the target layer code path to call the call-back function name embedded in the source layer code path using the embedded generic call-back function name, permitting independence between the source layer and the target layer.

12. The computer program product of claim 11, further comprising a client source layer code path assigned to each programming model in a multi-communications protocol.

13. The computer program product of claim 12, further comprising a client target layer code path assigned to each communications protocol.

14. The computer program product of claim 13, further comprising a server source layer code path assigned to each communications model.

15. The computer program product of claim 14, further comprising a server target layer code path assigned to each programming model in a multi-communications protocol.

16. The client computer of claim 11, further comprising a client source layer code path designated for each programming model.

17. The client computer of claim 16, further comprising a client target layer code path designated for each communications protocol.

18. The client computer of claim 17, further comprising a server source layer code path designated for each communications model.

19. The client computer of claim 18, further comprising a server target layer code path designated for each programming model.

* * * * *